United States Patent
Fujita et al.

(10) Patent No.: US 7,800,713 B2
(45) Date of Patent: Sep. 21, 2010

(54) LIQUID CRYSTAL DISPLAY DEVICE AND APPARATUS WITH DISPLAY FUNCTION

(75) Inventors: Tsutomu Fujita, Hashima (JP); Shigeru Yoshida, Ogaki (JP); Tomoyuki Ono, Gifu (JP); Yutaka Sakaida, Kakamigahara (JP)

(73) Assignee: Sanyo Electric Co., Ltd., Osaka (JP)

( * ) Notice: Subject to any disclaimer, the term of this patent is extended or adjusted under 35 U.S.C. 154(b) by 384 days.

(21) Appl. No.: 11/943,096

(22) Filed: Nov. 20, 2007

(65) Prior Publication Data

US 2008/0117363 A1 May 22, 2008

(30) Foreign Application Priority Data

Nov. 20, 2006 (JP) ............................. 2006-313062
Oct. 11, 2007 (JP) ............................. 2007-265114

(51) Int. Cl.
*G02F 1/1347* (2006.01)
(52) U.S. Cl. .......................................... 349/74; 349/58
(58) Field of Classification Search .................. 349/74, 349/58, 73, 15
See application file for complete search history.

(56) References Cited

U.S. PATENT DOCUMENTS

| | | | | | |
|---|---|---|---|---|---|
| 5,663,776 | A | * | 9/1997 | Behrends | 349/58 |
| 6,646,697 | B1 | * | 11/2003 | Sekiguchi et al. | 349/73 |
| 7,268,841 | B2 | * | 9/2007 | Kasajima et al. | 349/96 |
| 7,405,925 | B2 | * | 7/2008 | Sung | 361/679.27 |
| 2005/0225694 | A1 | * | 10/2005 | Akagawa et al. | 349/58 |
| 2005/0237444 | A1 | * | 10/2005 | You | 349/61 |

FOREIGN PATENT DOCUMENTS

| JP | 3335998 | 8/2002 |
|---|---|---|
| WO | WO 99/42889 | 8/1999 |

\* cited by examiner

*Primary Examiner*—Thoi V Duong
(74) *Attorney, Agent, or Firm*—Ditthavong, Mori & Steiner, P.C.

(57) ABSTRACT

Two liquid crystal panels are laid one over the other in a state that each of the liquid crystal panels is oriented in a forward direction. At least one spacer is detachably provided between the two liquid crystal panels. The liquid crystal panels are positioned relative to each other by a plurality of through-holes arrayed in a thickness direction of the spacer by an interval corresponding to the thickness of the spacer, and a projection engageable in one of the through-holes.

2 Claims, 16 Drawing Sheets

LIQUID CRYSTAL DISPLAY DEVICE AND APPARATUS WITH DISPLAY FUNCTION

This application claims priority under 35 U.S.C. Section 119 of Japanese Patent Application No. 2006-313062 filed Nov. 20, 2006, entitled "LIQUID CRYSTAL DISPLAY DEVICE" and Japanese Patent Application No. 2007-265114 filed Oct. 11, 2007, entitled "LIQUID CRYSTAL DISPLAY DEVICE AND APPARATUS WITH DISPLAY FUNCTION".

BACKGROUND OF THE INVENTION

1. Field of the Invention

The present invention relates to a liquid crystal display device, and an apparatus, with a display function, including the liquid crystal display device, and more particularly to a liquid crystal display device and an apparatus, with a display function, including the liquid crystal display device, for e.g. outputting multiple images to be individually reproduced on multi-layered liquid crystal panels from the front side.

2. Description of the Background Art

In current days, a liquid crystal display device is incorporated in various apparatuses. In apparatuses such as game machines or amusement machines, an intended content image is displayed on the liquid crystal display device. The liquid crystal display device provides realistic sensation, and a player finds a game or a play on the apparatuses interesting.

Conventionally, a single liquid crystal panel has been used in the liquid crystal display device. A display image is resultantly a two-dimensional image, and a viewer is required to wear e.g. dedicated glasses to view the display image with stereoscopic appearance. In recent years, there is used a technique of arranging multiple liquid crystal panels in the thickness direction of the display device to allow a user to view a display image with three-dimensional appearance. In the technique, different images are displayed on the individual liquid crystal panels, and the viewer is allowed to view a composite image formed by synthesizing the different images displayed on the liquid crystal panels. With use of this technique, the composite image is provided with three-dimensional appearance by arranging the different images in the depthwise direction of the display device. Also, a visual effect can be changed by applying a special effect to the images displayed on the individual liquid display panels.

An example of the conventional device is disclosed in Japanese Patent No. 3,335,998. In the publication, multiple screens for reproducing individual images are disposed in parallel to each other by a predetermined distance. The distance is typically one-fourth of the vertical length of the front screen. The actual distance, however, is changed to obtain an intended effect. The publication, however, does not disclose a specific arrangement for changing the distance between the screens. If the distance between the screens can be properly adjusted, stereoscopic appearance of an image to be displayed in a multilayered manner can be improved.

SUMMARY OF THE INVENTION

It is an object of the present invention to provide an arrangement that enables to provide improved stereoscopic appearance of an image to be displayed in a multilayered manner by changing the number of spacers to be disposed between liquid crystal panels according to needs. It is another object of the invention to provide an arrangement that enables to smoothly fix the liquid crystal panels at their intended positions depending on the distance of the liquid crystal panels defined by the spacer.

A liquid crystal display device according to a first aspect of the invention includes: a plurality of liquid crystal panels laid one over the other; at least one or more spacers detachably provided between the liquid crystal panels; and an engaging portion for determining positions of the liquid crystal panels.

A liquid crystal display device according to a second aspect of the invention includes: a first liquid crystal panel; a second liquid crystal panel disposed in forward and rearward directions relative to the first liquid crystal panel; a spacer for defining a distance between the first liquid crystal panel and the second liquid crystal panel; and a fixing mechanism for fixing positions of the first liquid crystal panel and the second liquid crystal panel, wherein the fixing mechanism fixes the first liquid crystal panel and the second liquid crystal panel at the positions corresponding to the distance defined by the spacer.

An apparatus with a display function according to a primary aspect of the invention includes: a liquid crystal display device having a first liquid crystal panel, a second liquid crystal panel disposed in forward and rearward directions relative to the first liquid crystal panel, a spacer for defining a distance between the first liquid crystal panel and the second liquid crystal panel, and a fixing mechanism for fixing positions of the first liquid crystal panel and the second liquid crystal panel, the fixing mechanism fixing the first liquid crystal panel and the second liquid crystal panel at the positions corresponding to the distance defined by the spacer; and a circuit section for controlling driving of the first liquid crystal panel and the second liquid crystal panel.

BRIEF DESCRIPTION OF THE DRAWINGS

These and other objects, and novel features of the present invention will become more apparent upon reading the following detailed description along with the accompanying drawings.

It should be noted that the drawings are merely used for describing the embodiments, and do not delimit the scope of the invention.

DESCRIPTION OF THE PREFERRED EMBODIMENTS

Figure 1:
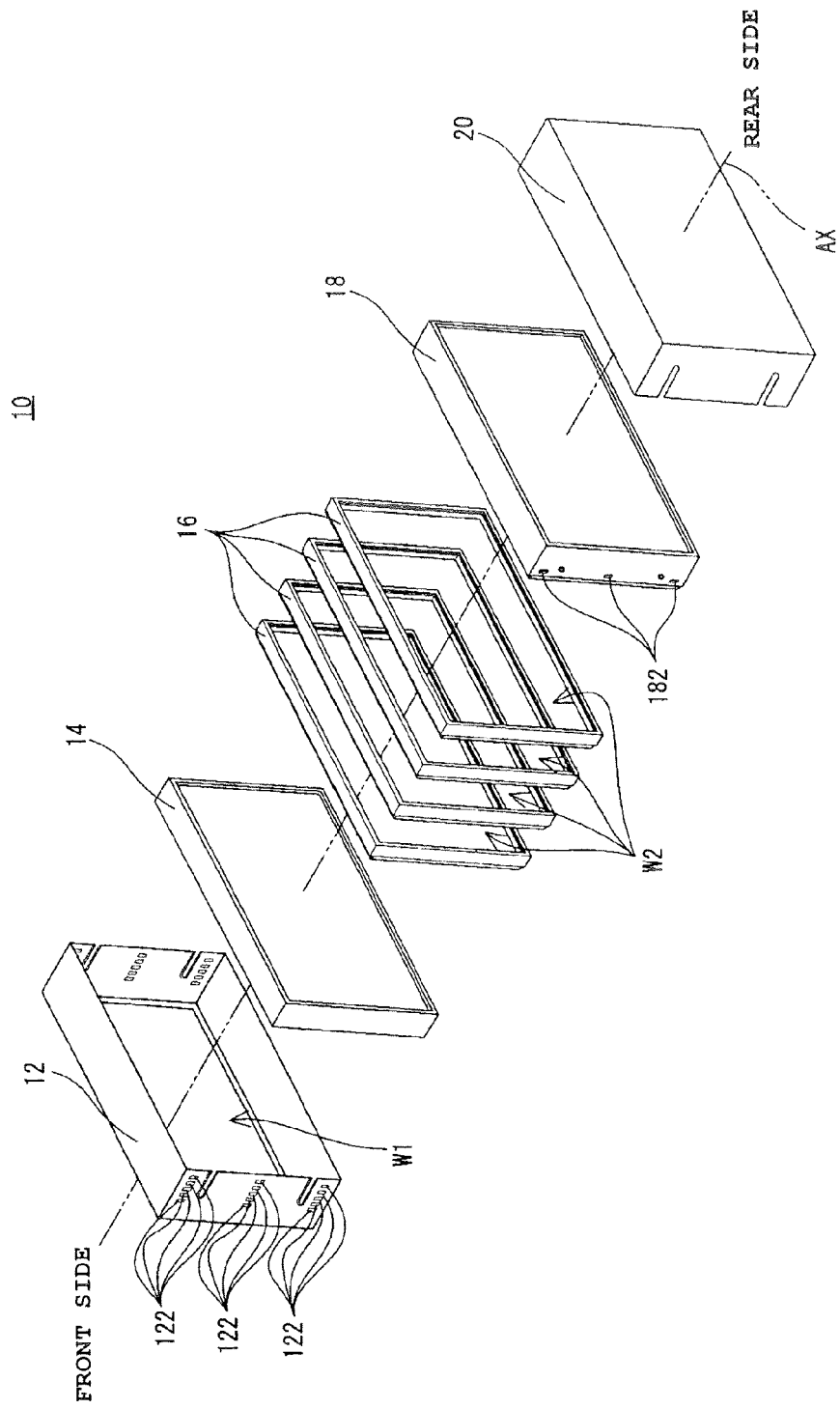
FIG. 1 is a perspective view showing an exploded state of a liquid crystal display device embodying the invention.

Referring to FIG. 1, a liquid crystal display device 10 embodying the invention includes a front cover 12, a front-side liquid crystal panel 14, multiple (in this embodiment, four) spacers 16, 16, . . . , a rear-side liquid crystal panel 18, and a rear cover 20.

The liquid crystal panels 14 and 18 each has a rectangular plate-like shape. The size of a primary plane, and the size of a display screen to be mounted on the primary plane are identical between the liquid crystal panels 14 and 18. The spacers 16, 16, . . . , are each made of a synthetic resin, and formed into a rectangular frame shape. The size of the spacer 16 is substantially the same as the size of the primary plane of the liquid crystal panel 14 or 18. The size of a window W2 defined by the frame of the spacer 16 is substantially the same as the size of the display screen.

The liquid crystal panel 14, the spacers 16, 16, . . . , and the liquid crystal panel 18 are laid one over the other in the direction of an axis AX in such a manner that the centers of the primary planes of the respective panels and the windows W2 of the spacers 16 are aligned with the axis AX and that four corners of each of the components are contacted with each other. Both of the display screens of the multi-layered liquid crystal panels 14 and 18 are oriented in a forward direction.

The front cover 12 is a rectangular parallelepiped cover for covering an outer perimeter of a front wall, and side walls of the liquid crystal panel 14. A window W1 having the same size as the display screen of the liquid crystal panel 14 is formed in the primary plane of the front cover 12. The rear cover 20 is a rectangular parallelepiped cover for covering a rear wall and side walls of the liquid crystal panel 18. The multi-layered body constituted of the liquid crystal panel 14, the spacers 16, 16, . . . , and the liquid crystal panel 18 is sealably covered by the front cover 12 and the rear cover 20.

Figure 2A:
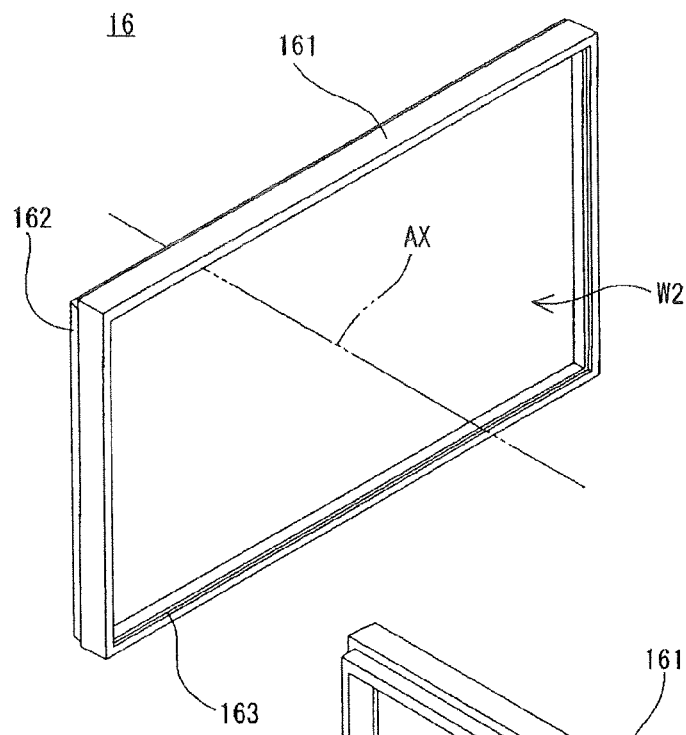
FIG. 2A is a perspective view of a spacer viewed from an obliquely forward direction in accordance with the embodiment.
Figure 2B:
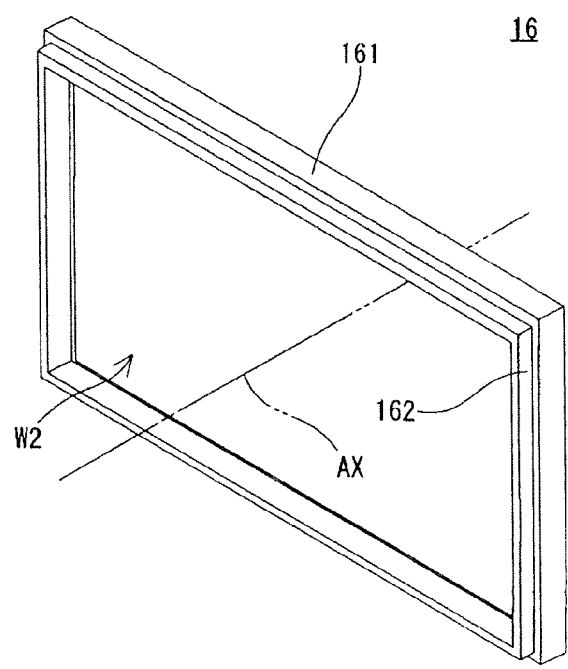
FIG. 2B is a perspective view of the spacer viewed from an obliquely rearward direction in accordance with the embodiment.
Figure 3:
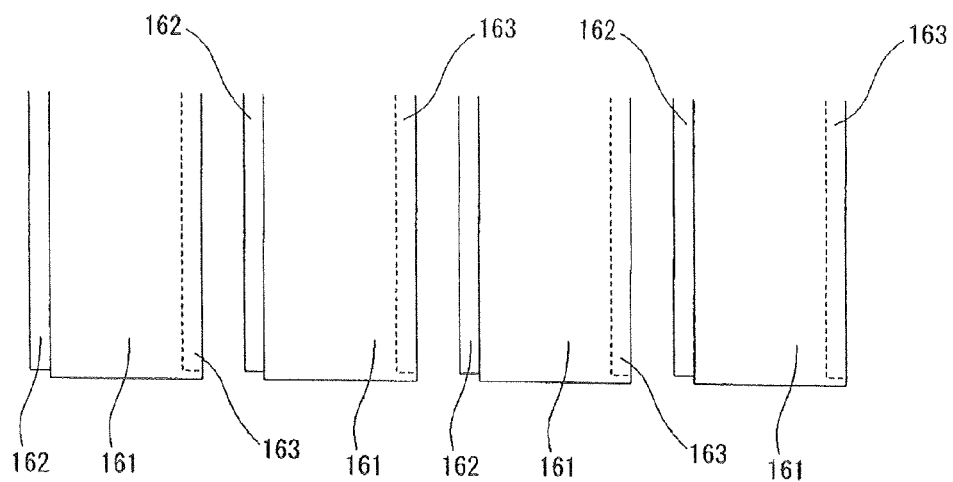
FIG. 3 is a partially enlarged view of a part of spacers to be multi-layered in accordance with the embodiment.

Referring to FIGS. 2A, 2B, and 3, the spacer 16 has a rectangular frame 161 for defining the window W2. An inner peripheral portion of the frame 161 is embossed along the direction of axis AX. One side of the inner peripheral portion of the frame 161 is formed with a rib 162, and the other side thereof is formed with a recess 163. With this arrangement, when the spacers 16, 16, . . . , are laid one over the other in the direction of axis AX in a state that the ribs 162 are oriented in the same direction and that four corners of each frame 161 are contacted with each other, the rib 162 of each one of the spacers 16 is engaged in the recess 163 of the counterpart spacer 16. Thereby, the spacers 16, 16, . . . , are positioned relative to each other.

Figure 4:
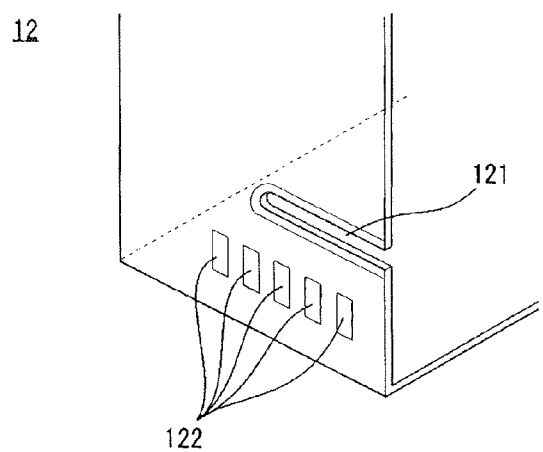
FIG. 4 is a partially enlarged view of a part of a front cover in accordance with the embodiment.

Referring to FIG. 4, a side wall of the front cover 12 is formed with a substantially U-shaped cutaway (slit) 121 which is opened rearwardly and extends forwardly along the axis AX. Multiple (in this embodiment, five) through-holes 122, 122, . . . , are formed in the side wall of the front cover 12 along the axis AX. Each through-hole 122 has a rectangular shape, and the interval between the adjoining two through-holes 122 and 122 corresponds to the thickness of the spacer 16. Specifically, the interval between the two adjoining through-holes 122 and 122 corresponds to the thickness of the outer peripheral portion or the inner peripheral portion of the frame 161. If the thickness of the outer peripheral portion or the inner peripheral portion of the frame 161 is 50 mm, the interval between the two adjoining through-holes 122 and 122 is 50 mm.

As is obvious from FIG. 1, the cutaway 121 is formed at four sites i.e. upper and lower positions in each of the left and right side walls of the front cover 12. The array of through-holes 122, 122, . . . , is formed at six sites i.e. upper, middle, and lower positions in each of the left and right side walls of the front cover 12.

Figure 5:
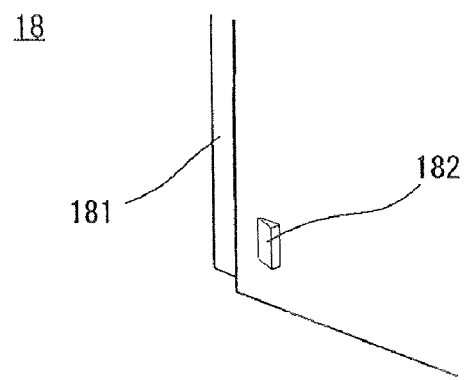
FIG. 5 is a partially enlarged view of a part of a rear-side liquid crystal panel in accordance with the embodiment.

Referring to FIG. 5, a rib 181 engageable in the recess 163 formed in the rearmost spacer 16 is formed on the front wall of the liquid crystal panel 18. A projection (tab) 182 engageable in one of the through-holes 122, 122, . . . , is formed on a side wall of the liquid crystal panel 18. The projection 182 is formed at six sites i.e. upper, middle, and lower positions on each of the left and right side walls of the liquid crystal panel 18.

Figure 6:
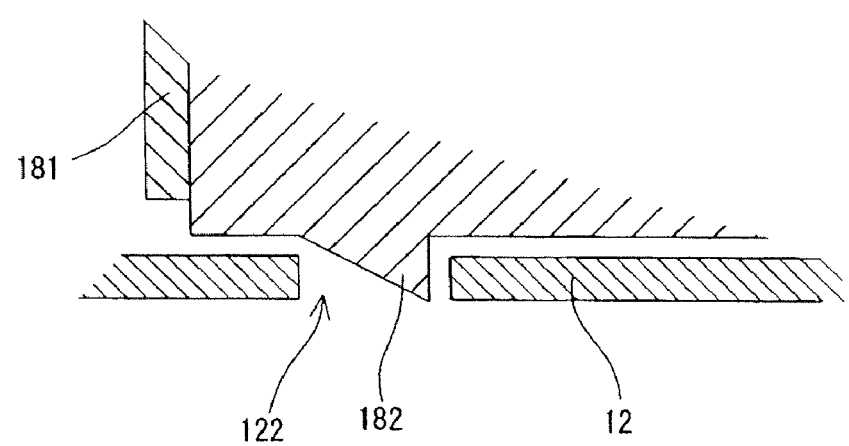
FIG. 6 is a partial cross-sectional view showing an example of an engaged state of the front cover and the rear-side liquid crystal panel in accordance with the embodiment.

As is obvious from FIG. 6, the projection 182 is formed into a saw-tooth shape viewed from above, and has a slope tapered inwardly as extending forwardly. The projection 182 is engaged in the foremost through-hole 122 of the through-hole array 122, 122, . . . , shown in FIG. 4, when the number of the spacers 16 disposed between the liquid crystal panels 14 and 18 is "0". When the number of the spacers 16 disposed between the liquid crystal panels 14 and 18 is "4", the projection 182 is engaged in the rearmost through-hole 122 of the through-hole array 122, 122, . . . , shown in FIG. 4.

Figure 7A:
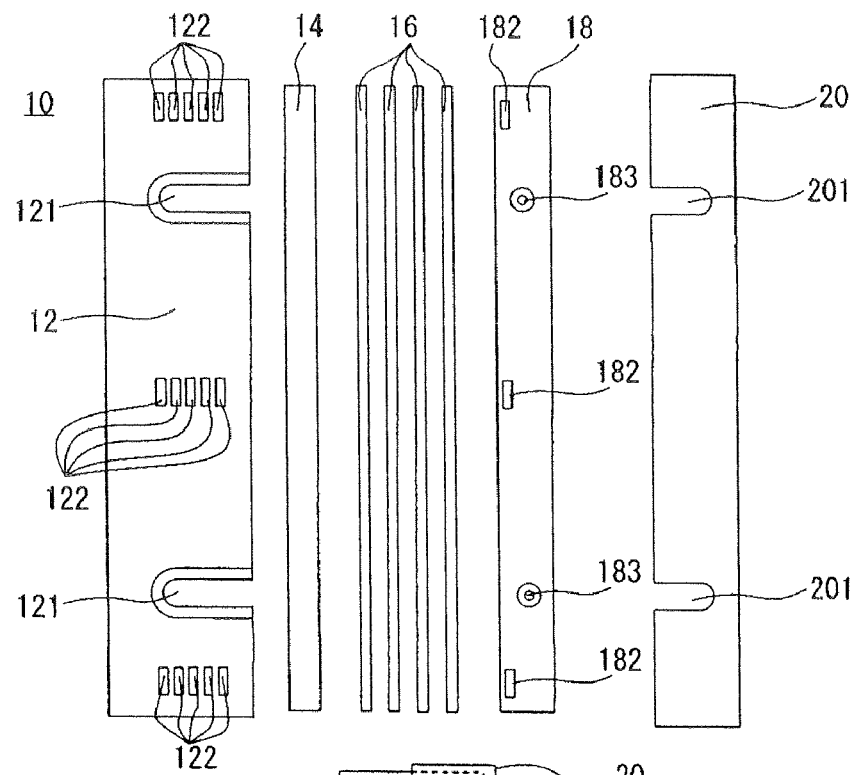
FIG. 7A is a side view showing an example of an exploded state of the liquid crystal display device in accordance with the embodiment.

Referring to FIG. 7A, threaded holes 183, 183, . . . , are formed in the left and right side walls of the liquid crystal panel 18 in correspondence to the cutaways 121, 121 . . . , formed in the left and right side walls of the front cover 12. Cutaways 201, 201, . . . , are formed in the left and right side walls of the rear cover 20 in correspondence to the cutaways 121, 121, . . . , formed in the left and right side walls of the front cover 12.

With this arrangement, when the liquid crystal panel 14, the spacers 16, 16, . . . , and the liquid crystal panel 18 are encased in the front cover 12 in a state that the four spacers 16, 16, . . . , are sandwiched between the liquid crystal panels 14 and 18, the projections 182 formed on the liquid crystal panel 18 are engaged in the corresponding rearmost through-holes 122, and the threaded holes 183 formed in the liquid crystal panel 18 are exposed outside through the corresponding cutaways 121.

Figure 7B:
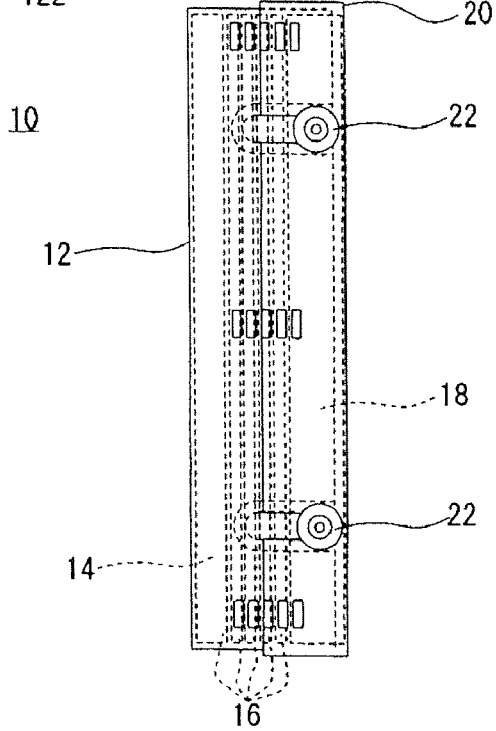
FIG. 7B is a side view showing an example of an assembled state of the liquid crystal display device in accordance with the embodiment.

In the above state, when the liquid crystal panel 18 is covered by the rear cover 20, the threaded holes 183 are exposed outside through the corresponding cutaways 201 formed in the rear cover 20. When screws 22 are screwed into the corresponding threaded holes 183, an outer periphery of each screw 22 is abutted against the corresponding cutaways 121 and 201, whereby the front cover 12 and the rear cover 20 are cooperatively fastened to the liquid crystal panel 18. Thus, the liquid crystal display device 10 shown in FIG. 7B is fabricated.

Figure 8:
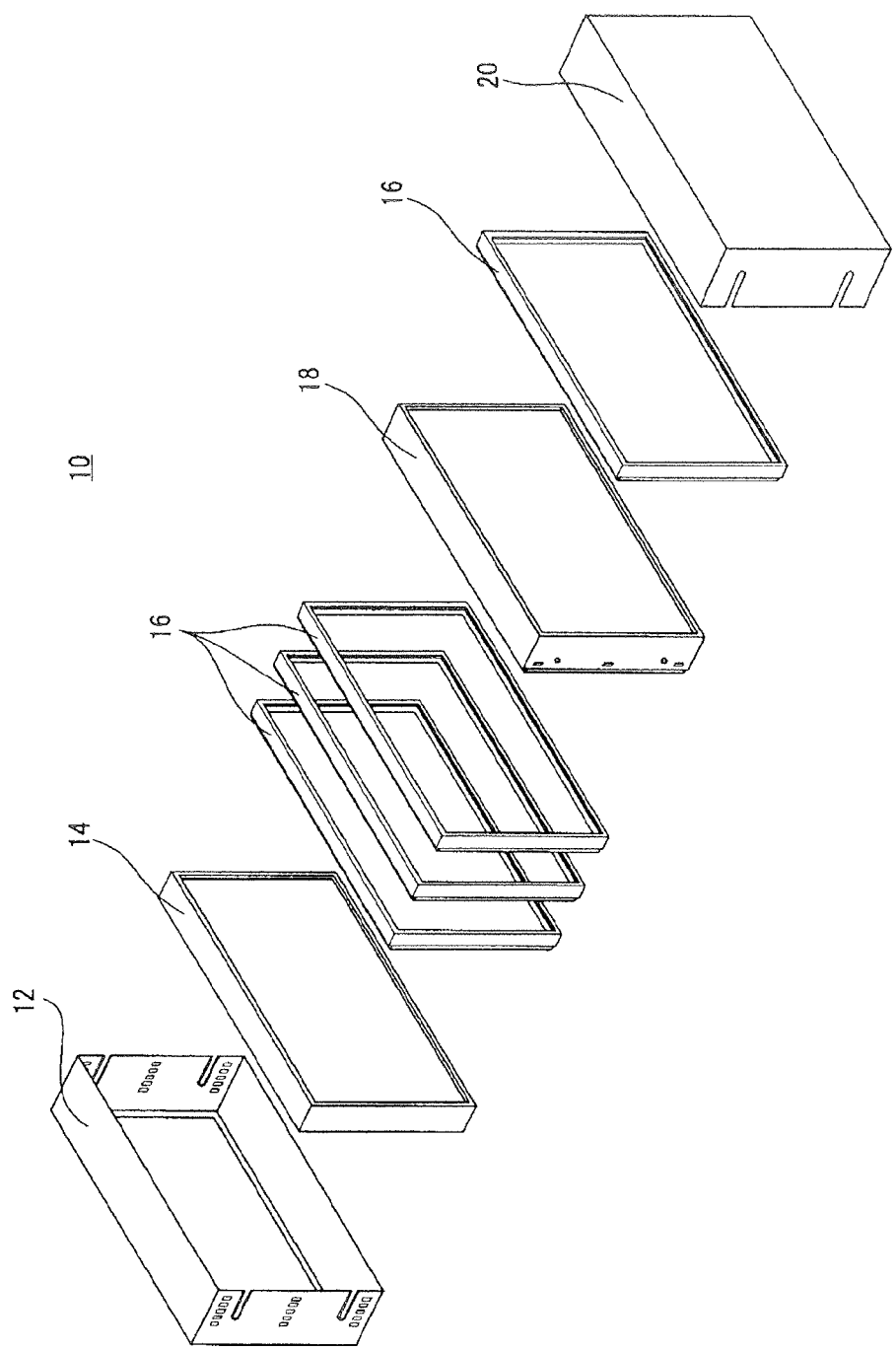
FIG. 8 is a perspective view showing another embodiment of an exploded state of the liquid crystal display device in the invention.
Figure 9:
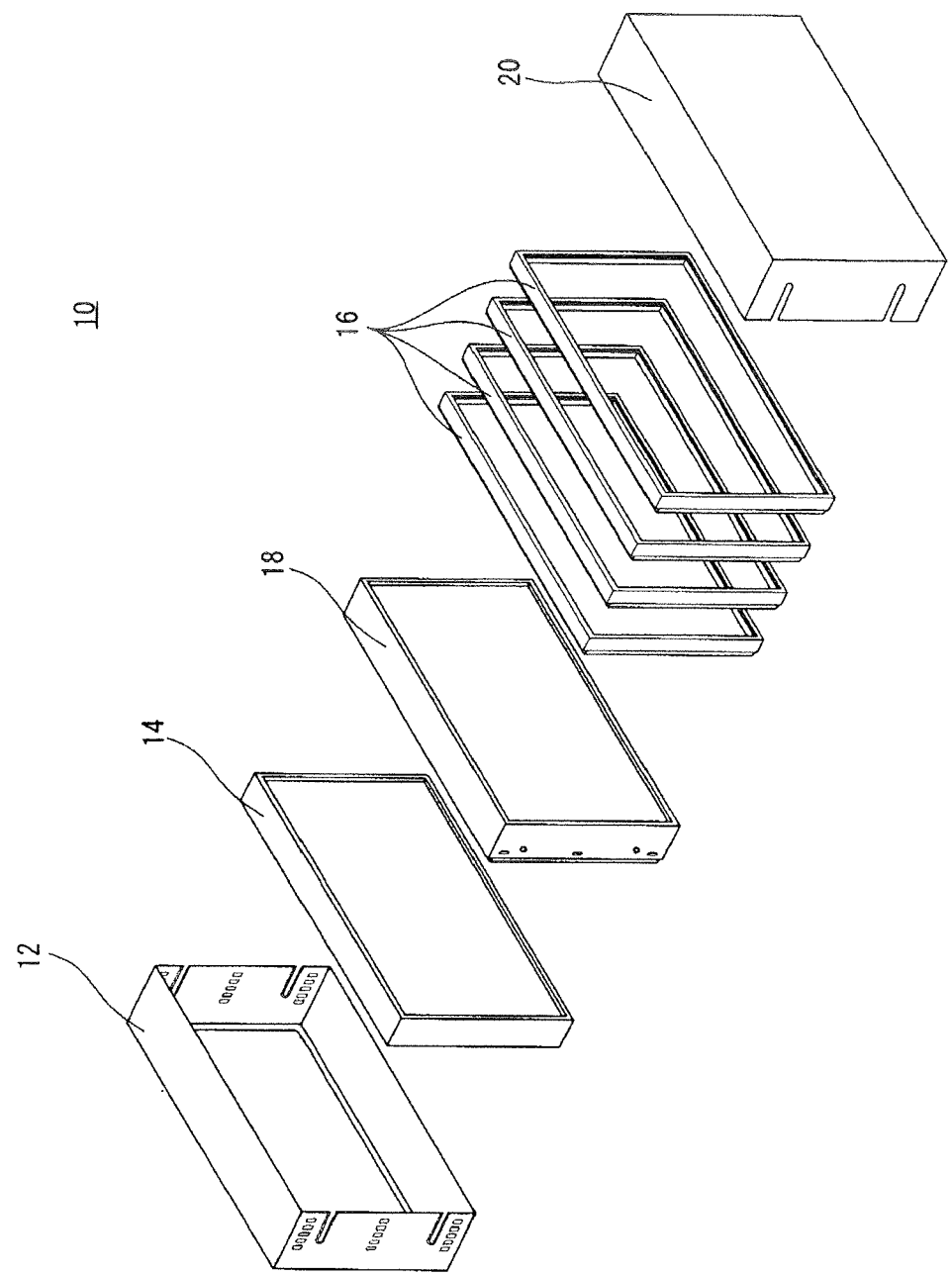
FIG. 9 is a perspective view showing yet another embodiment of an exploded state of the liquid crystal display device in the invention.
Figure 10:
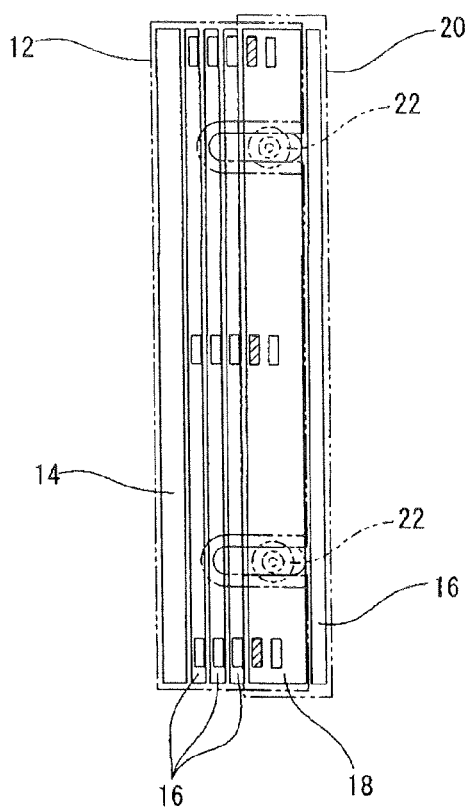
FIG. 10 is a side view showing an example of an assembled state of the embodiment shown in FIG. 8.
Figure 11:
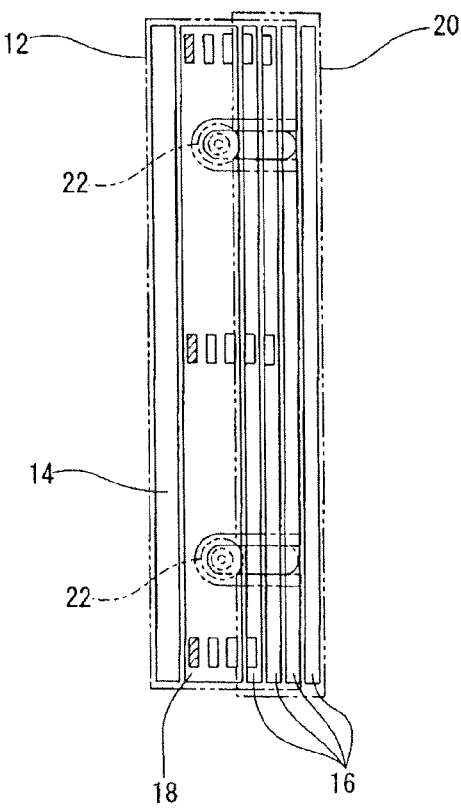
FIG. 11 is a side view showing an example of an assembled state of the embodiment shown in FIG. 9.

As shown in FIG. 8, if three spacers 16, 16 . . . , are disposed between the liquid crystal panels 14 and 18, and another spacer 16 is disposed between the liquid crystal panel 18 and the rear cover 20, a liquid crystal display device 10 as shown in FIG. 10 is fabricated. Further, as shown in FIG. 9, if all the four spacers 16 are provided between the liquid crystal panel 18 and the rear cover 20, a liquid crystal display device 10 as shown in FIG. 11 is fabricated.

As is obvious from the above description, the liquid crystal panels 14 and 18 are laid one over the other in a state that each of the liquid crystal panels 14 and 18 is oriented in a forward direction. Four (the number is N) spacers 16, 16, . . . , are detachably provided between the liquid crystal panels 14 and 18. The liquid crystal panels 14 and 18 are positioned relative to each other by the arrays of five through-holes 122, 122, . . . , each of which is arrayed in the thickness direction of the spacer 16 by the interval corresponding to the thickness of the spacer 16, and the projections 182, each of which is engageable in one of the through-holes 122, 122, . . . .

Since the spacers 16 are detachably provided between the liquid crystal panels 14 and 18, stereoscopic appearance of an image to be displayed in a multi-layered manner can be adjusted. Also, since the through-holes 122, 122, . . . , are formed in the thickness direction of the spacer 16 by the interval corresponding to the thickness of the spacer 16, and each projection 182 is engaged in one of the through-holes 122, 122, . . . , the liquid crystal panels 14 and 18 can be fixed to each other irrespective of the number of the spacers 16.

In this embodiment, the two liquid crystal panels 14 and 18 are laid one over the other. Alternatively, the number of the liquid crystal panels to be multi-layered may be three or more. In this embodiment, the projections 182 formed on the side walls of the liquid crystal panel 18 are engaged in the corresponding through-holes 122 formed in the side walls of the front cover 12, respectively. Alternatively, two engaging portions engageable with each other may be formed on the liquid crystal panels 14 and 18, respectively, or may be formed on the liquid crystal panel 14 and the rear cover 20, respectively. Further alternatively, a projection may be formed on the side wall of the liquid crystal panel 14, and plural through-holes engageable with the projection may be formed in the side wall of the rear cover 20.

Figure 12:
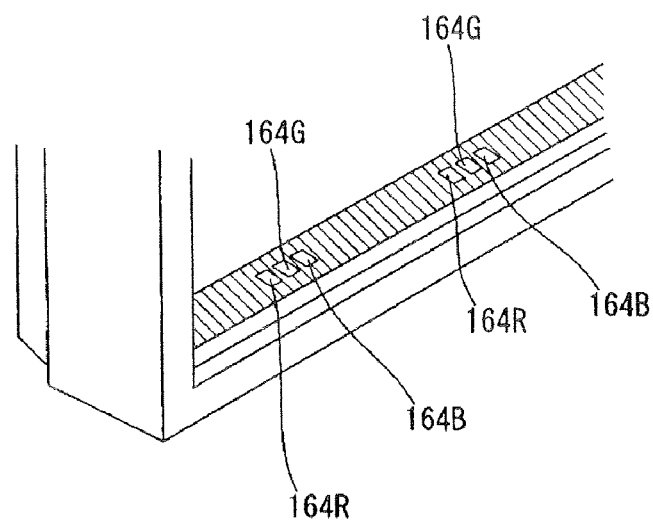
FIG. 12 is a partially enlarged view showing another example of the spacer to be used in the embodiment.
Figure 13:
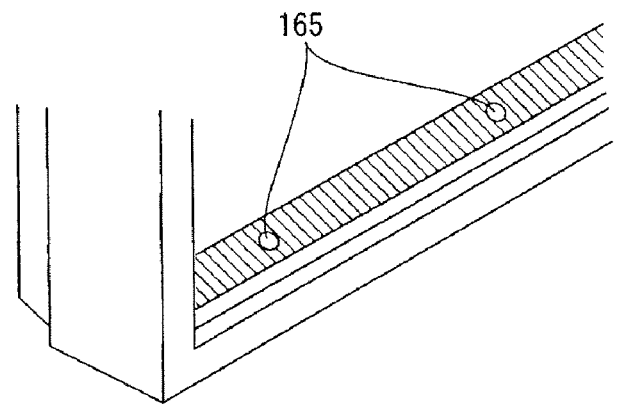
FIG. 13 is a partially enlarged view showing yet another example of the spacer to be used in the embodiment.

In this embodiment, the inner peripheral portion of the spacer 16 is merely embossed. Additionally, LEDs 164R, 164G, and 164B of three primary colors as shown in FIG. 12 may be provided on the inner peripheral portion of the spacer 16, or semiconductor lasers 165 as shown in FIG. 13 may be provided on the inner peripheral portion of the spacer 16. Alternatively, a reflection member such as a mirror may be attached to the entire surface of the inner perimeter of the spacer 16 indicated by the hatched portion. In the modification, a special visual effect may be applied to an image to be outputted from the front side of the display device, or the spacers 16 may be made invisible from the front side. Preferably, a laser beam to be outputted from the semiconductor lasers 165 is radiated on a diffuser of the liquid crystal panel 18.

The liquid crystal display device 10 in the embodiment can be incorporated in a game machine such as a pachinko machine or a slot machine, a cash dispenser, or a like apparatus.

Figure 14:
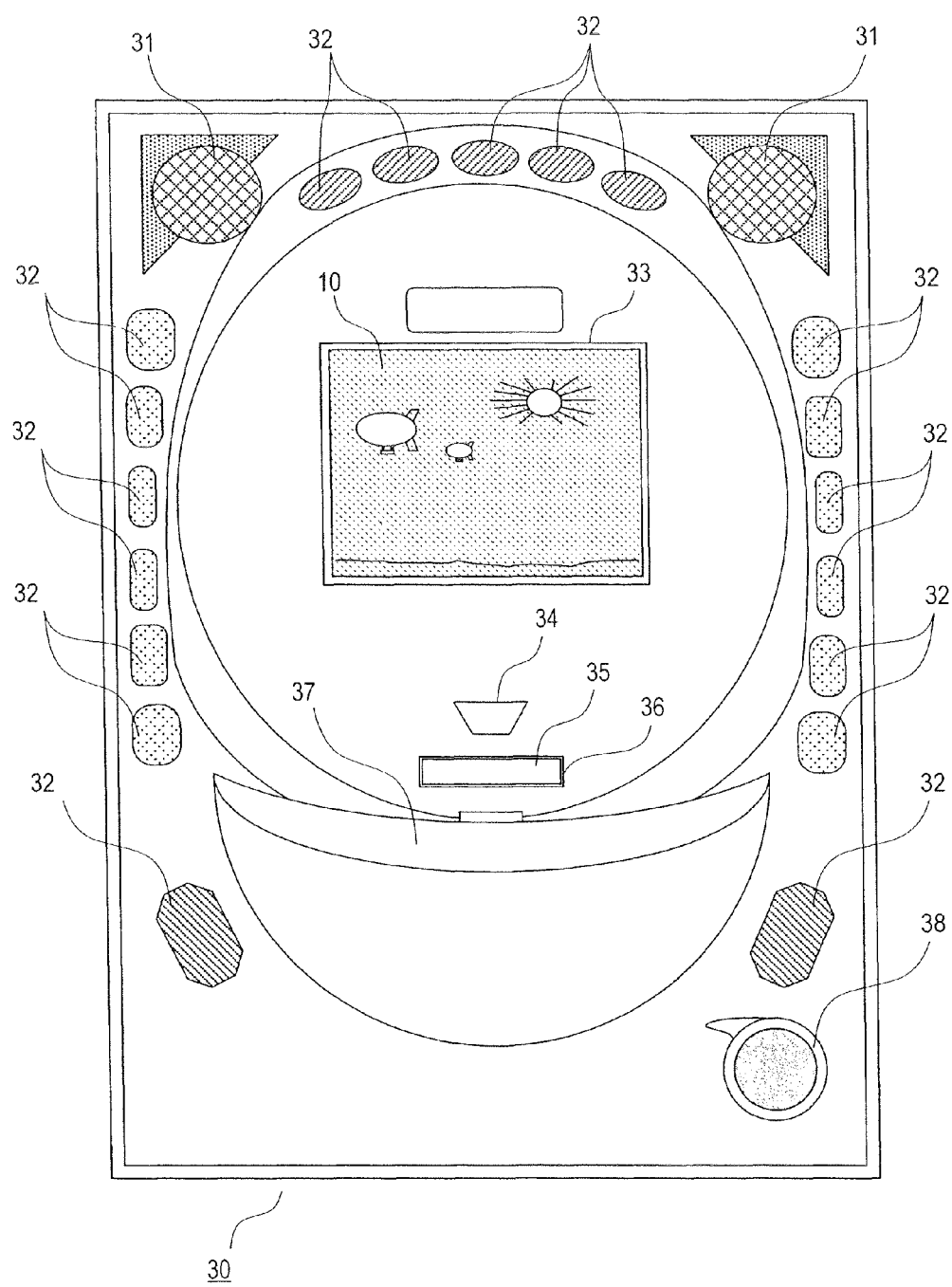
FIG. 14 is a diagram showing an arrangement that the liquid crystal display device in accordance with the embodiment is incorporated in a pachinko machine.

FIG. 14 is a front view of a pachinko machine incorporated with the liquid crystal display device 10. A hollow portion 33 is formed in a front panel of a pachinko machine 30. The liquid crystal display device 10 is mounted to the pachinko machine 30 in such a manner that the window W1 of the front cover 12 is exposed outside through the hollow portion 33. The reference numeral 31 indicates a speaker, and the reference numeral 32 indicates a light emitter such as a lamp or an LED.

The pachinko machine 30 is constructed in such a manner that a pachinko ball bounces toward an upper portion of the front panel when a player turns a grip 38 clockwise. When a pachinko ball enters a prize slot 34, several pachinko balls are dispensed on a ball tray 37, and at the same time, the liquid crystal display device 10 is driven. When an image displayed on the liquid crystal display device 10 shows a hit, a lid 35 is opened for a predetermined time, and pachinko balls are allowed to enter an opening 36 which is normally closed by the lid 35. When the pachinko balls enter the opening 36, a predetermined number of pachinko balls are dispensed on the ball tray 37 in accordance with the number of pachinko balls entering into the opening 36.

Figure 15:
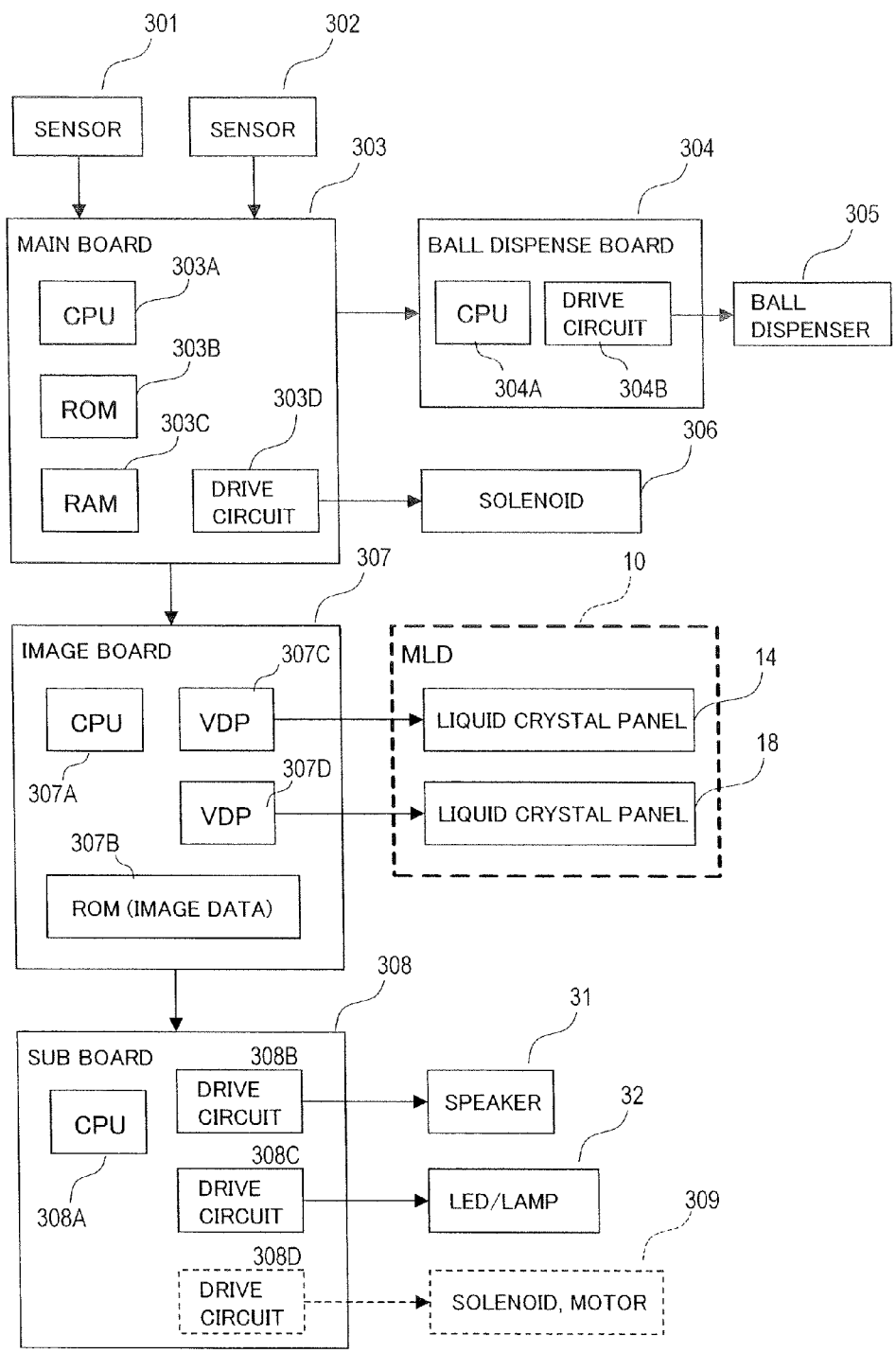
FIG. 15 is a diagram showing a circuit configuration of the arrangement shown in FIG. 14.

FIG. 15 is a diagram showing a circuit configuration of the pachinko machine. In FIG. 15, a drive control system of the liquid crystal display device 10 and peripheral circuits of the drive control system are shown.

The reference numerals 301 and 302 indicate sensors for detecting a pachinko ball entering into the prize slot 34 and the opening 36, respectively. The sensors 301 and 302 are provided in a channel along which pachinko balls entering into the prize slot 34 and the opening 36 are allowed to pass so as to detect the pachinko balls passing through the channel. The sensors 301 and 302 may be of a type for magnetically detecting passing of pachinko balls, or sensors for mechanically detecting passing of pachinko balls. Detection signals from the sensors 301 and 302 are inputted to a CPU 303A of a main board 303.

The CPU 303A, an ROM 303B, an RAM 303C, and a drive circuit 303D are arranged on the main board 303. The CPU 303A performs processing in accordance with a program stored in the ROM 303B. The RAM 303C is used as a work memory of the CPU 303A. Specifically, various data are temporarily stored in the RAM 303C in performing the processing by the CPU 303A. The drive circuit 303D drives a solenoid 306 in response to a command from the CPU 303A. By this control, the lid 35 shown in FIG. 14 is opened so that pachinko balls are allowed to come into the opening 36.

An image board 307 is adapted to control driving of the liquid crystal display device 10. A CPU 307A, an ROM 307B, VDPs (Video Display Processors) 307C and 307D are arranged on the image board 307. The CPU 307A performs processing in accordance with a program stored in an internal memory. The ROM 307B stores image data to be displayed on the liquid crystal panels 14 and 18. The VDPs 307C and 307D drive the liquid crystal panels 14 and 18 in response to a command from the CPU 307A, respectively. By this control, an image based on the image data stored in the ROM 307B is displayed on the liquid crystal panels 14 and 18.

A sub board 308 is adapted to control driving of the speakers 31 and the light emitters 32 shown in FIG. 14. A CPU 308A and drive circuits 308B and 308C are arranged on the sub board 308. The CPU 308A performs processing in accordance with a program stored in an internal memory. The drive circuits 308B and 308C drive the speakers 31 and the light emitters 32 in response to a command from the CPU 308A, respectively. In the case where a gimmick mechanism such as a windmill or a doll is incorporated in the pachinko machine, a drive circuit 308D for driving a power source 309 such as a solenoid or a motor is additionally provided on the sub board 308.

In response to input of a detection signal from the sensor 301, the CPU 303A outputs a command of dispensing pachinko balls to a CPU 304A on a ball dispense board 304. Simultaneously, the CPU 303A outputs a command of displaying an image in a predetermined mode to the CPU 307A on the image board 307. Upon receiving the command, the CPU 304A outputs a drive command to a drive circuit 304B. Thereby, a ball dispenser 305 is driven to dispense a predetermined number of pachinko balls on the ball tray 37.

In the above operation, the CPU 307A causes the VDPs 307C and 307D to display a display image in the mode designated by the CPU 303A. Then, the VDPs 307C and 307D read image data corresponding to the designated mode from the ROM 307B to display the image on the liquid crystal panels 14 and 18, respectively.

Then, the CPU 307A outputs a drive command corresponding to the mode designated by the CPU 303A to the CPU 308A of the sub board 308. Upon receiving the command, the CPU 308A outputs a drive signal in accordance with the designated mode to the drive circuits 308B and 308C. Thereby, the speakers 31 and the light emitters 32 are driven in a status corresponding to the designated mode.

While the operation of the pachinko machine progresses, the CPU 303A on the main board 303 monitors a status of ball entering into the prize slot, based on the detection signal inputted from the sensor 301, and judges the timing of hit properly. If the CPU 303A judges that it is the timing of hit, the CPU 303A outputs a drive command to the drive circuit 303D to drive the solenoid 306. Thereby, the lid 35 is opened, and the opening 36 is brought to an opened state. Thereafter, every time the pachinko ball enters the opening 36, the sensor 302 outputs a detection signal to the CPU 303A. Upon receiving the detection signal, the CPU 303A outputs a ball dispense command to the ball dispense board 304. Thereby, the pachinko balls are sequentially dispensed on the ball tray 37.

When the CPU 303A judges that it is the timing of hit, the CPU 303A outputs a command of displaying an image in the mode corresponding to the hit to the image board 307. Upon receiving the command, the CPU 307A causes the VDPs 307C and 307D to display a display image in the mode corresponding to the hit. Then, the VDPs 307C and 307D read image data corresponding to the hit mode from the ROM 307B to display the image on the liquid crystal panels 14 and 18, respectively. Simultaneously, the CPU 307A outputs a drive command corresponding to the hit mode to the CPU 308A on the sub board 308. Thereby, the speakers 31 and the light emitters 32 are driven in a status corresponding to the hit mode.

In this way, by incorporating the liquid crystal display device 10 of the embodiment in the pachinko machine 30, the display image is provided with three-dimensional appearance or stereoscopic appearance. As a result, a visual effect by the display image can be improved, and a player finds it interesting and amusing to play with the pachinko machine 30. In particular, in use of the liquid crystal display device 10 of the embodiment, stereoscopic appearance of an image to be displayed in a multi-layered manner can be adjusted by detachably providing the spacers 16 between the liquid crystal panels 14 and 18. Thus, the stereoscopic appearance can be adjusted in conformity with the display image.

As shown in FIGS. 12 and 13, in the case where the LEDs 164R, 164G, and 164B are provided on the inner peripheral portion of the spacer 16, or the semiconductor lasers 165 are provided on the inner peripheral portion of the spacer 16, a drive circuit for driving the LEDs 164R, 164G, and 164B, or the semiconductor lasers 165 is additionally provided on the sub board 308 shown in FIG. 15.

Figure 16:
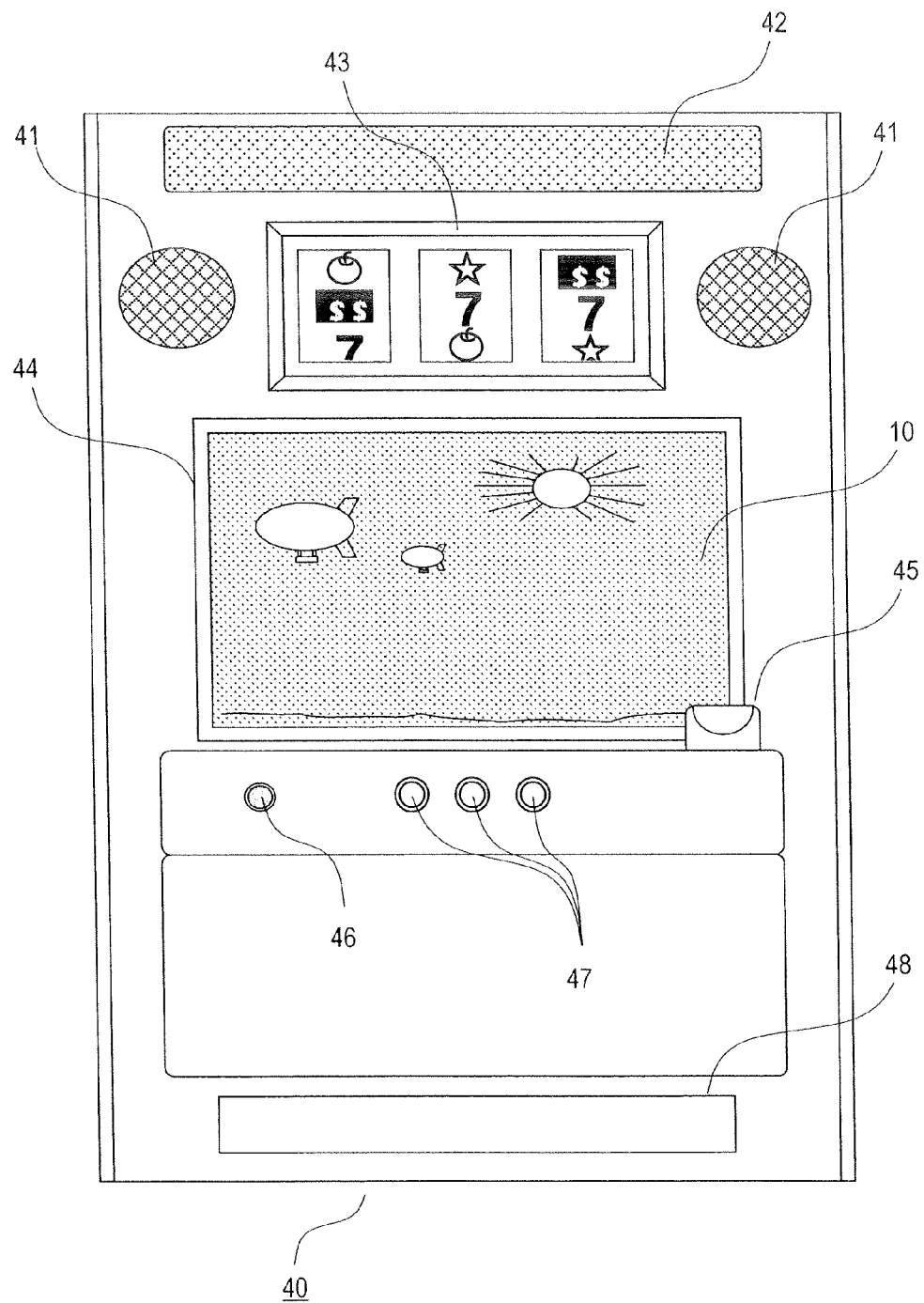
FIG. 16 is a diagram showing an arrangement that the liquid crystal display device in accordance with the embodiment is incorporated in a slot machine.

FIG. 16 is a diagram showing an arrangement that the liquid crystal display device 10 is incorporated in a slot machine. FIG. 16 is a front view of a slot machine 40. A hollow portion 44 is formed in a front panel of the slot machine 40. The liquid crystal display device 10 is mounted to the slot machine 40 in such a manner that the window W1 of the front cover 12 is exposed outside through the hollow portion 44. The reference numeral 41 indicates a speaker, and the reference numeral 42 indicates a light emitter such as a lamp or an LED.

The slot machine 40 is constructed in such a manner that when a player puts a token into a token slot 45 and pushes a lever 46 down, three reels 43 are rotated. Thereafter, when the player presses three stop buttons 47, rotations of the reels 43 corresponding to the stop buttons 47 are suspended. When all the numbers or symbols displayed on the reels 43 are identical, a predetermined number of tokens are dispensed on a token tray 48.

Figure 17:
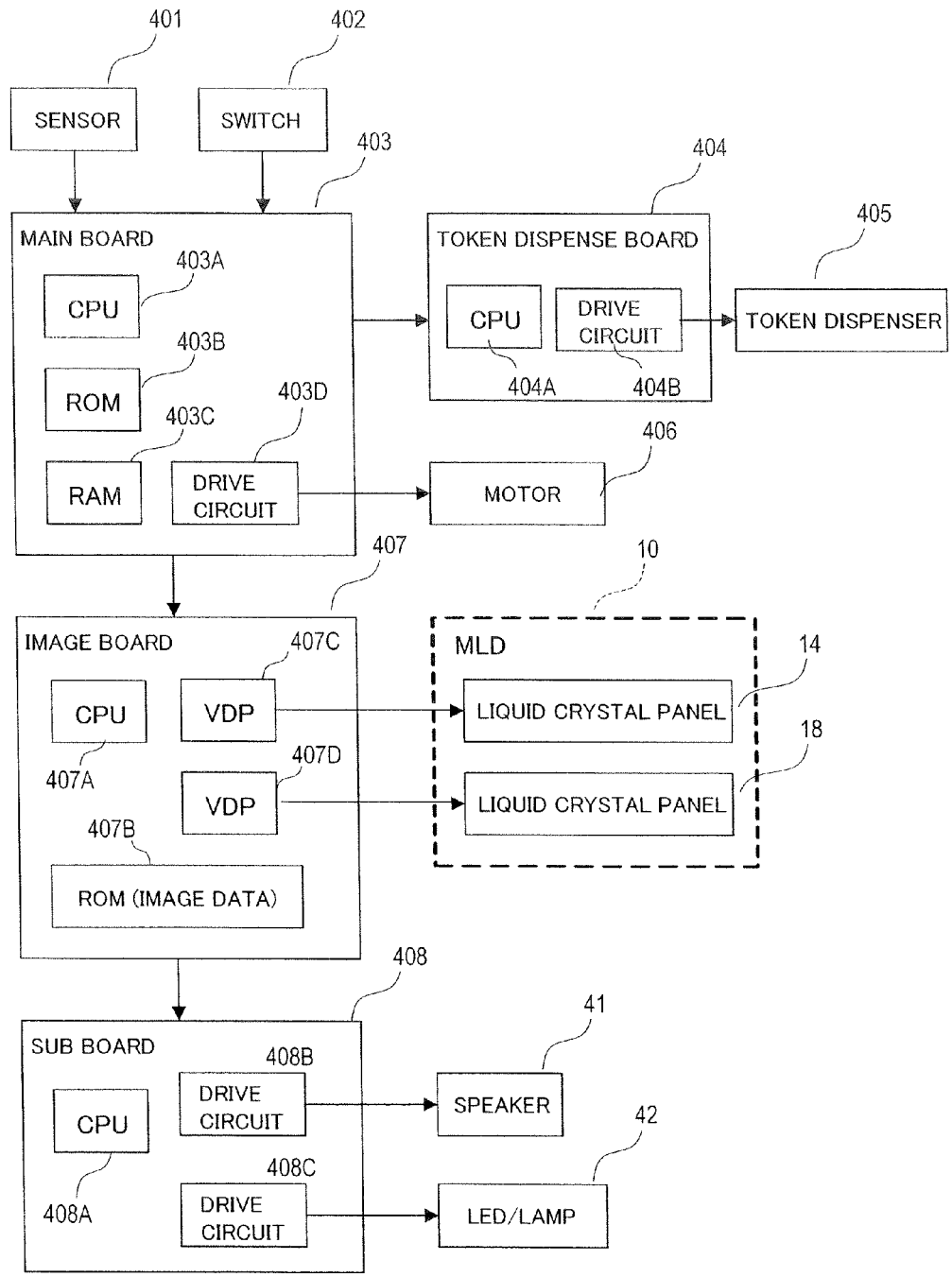
FIG. 17 is a diagram showing a circuit configuration of the arrangement shown in FIG. 16.

FIG. 17 is a diagram showing a circuit configuration of the slot machine 40. In FIG. 17, a drive control system of the liquid crystal display device 10 and peripheral circuits of the drive control system are shown.

The reference numeral 401 indicates a sensor for detecting whether a token is put into the token slot 45. A switch 402 is a switch to be operated when the lever 46 and the stop buttons 47 are manipulated. Signals from the sensor 401 and the switch 402 are inputted to a CPU 403A on a main board 403.

The CPU 403A, an ROM 403B, an RAM 403C, and a drive circuit 403D are arranged on the main board 403. The CPU 403A performs processing in accordance with a program stored in the ROM 403B. The RAM 403C is used as a work memory of the CPU 403A. Specifically, various data are temporarily stored in the RAM 403C in performing the processing by the CPU 403A. The drive circuit 403D drives a motor 406 or suspends driving of the motor 406 in response to a command from the CPU 403A. By this control, the reels 43 shown in FIG. 16 are rotated, or rotation thereof is suspended.

An image board 407 is adapted to control driving of the liquid crystal display device 10. A CPU 407A, an ROM 407B, VDPs (Video Display Processors) 407C and 407D are arranged on the image board 407. The CPU 407A performs processing in accordance with a program stored in an internal memory. The ROM 407B stores image data to be displayed on the liquid crystal panels 14 and 18. The VDPs 407C and 407D drive the liquid crystal panels 14 and 18 in accordance with a command from the CPU 407A, respectively. By this control, an image based on the image data stored in the ROM 407B is displayed on the liquid crystal panels 14 and 18.

A sub board 408 is adapted to control driving of the speakers 41 and the light emitter 42 shown in FIG. 16. A CPU 408A and drive circuits 408B and 408C are arranged on the sub board 408. The CPU 408A performs processing in accordance with a program stored in an internal memory. The drive circuits 408B and 408C drive the speakers 41 and the light emitter 42 in accordance with a command from the CPU 408A, respectively.

In response to input of a detection signal from the sensor 401, and an operation signal from the switch 402 indicating that the lever 46 is manipulated, the CPU 403A outputs a drive command to a CPU 403D. Thereby, the reels 43 are rotated.

Thereafter, in response to input of an operation signal from the switch 402 indicating that the stop buttons 47 are manipulated, the CPU 403A outputs a command of suspending rotation of the reels 43 corresponding to the respective stop buttons 47 to the drive circuit 403D. Thereby, rotation of the reels 43 is suspended.

In this operation, when all the numerals or symbols displayed on the reels 43 are identical, the CPU 403A outputs a token dispense command to a CPU 404A on a token dispense board 404, and simultaneously outputs a command of displaying an image in a mode corresponding to hit to the CPU 407A on the image board 407. Upon receiving the command, the CPU 404A outputs a drive command to the drive circuit 404B. Thereby, a token dispenser 405 is driven to dispense a predetermined number of tokens on the token tray 48.

In the above operation, the CPU 407A causes the VDPs 407C and 407D to display a display image in the hit mode designated by the CPU 403A. Then, the VDPs 407C and 407D read image data corresponding to the hit mode from the ROM 407B to display the image on the liquid crystal panels 14 and 18, respectively. Simultaneously, the CPU 407A outputs a drive command corresponding to the hit mode to the CPU 408A on the sub board 408. Thereby, the speakers 41 and the light emitter 42 are driven in a status corresponding to the hit mode.

In this way, by incorporating the liquid crystal display device 10 of the embodiment in the slot machine 40, the display image is provided with three-dimensional appearance or stereoscopic appearance. As a result, a visual effect by the display image can be improved, and a player finds it interesting and amusing to play with the slot machine 40. In particular, in use of the liquid crystal display device 10 of the embodiment, stereoscopic appearance of an image to be displayed in a multi-layered manner can be adjusted by detachably providing the spacers 16 between the liquid crystal panels 14 and 18. Thus, the stereoscopic appearance can be adjusted in conformity with the display image.

Similarly to the arrangement that the liquid crystal display device 10 is incorporated in the pachinko machine, in the above arrangement, as shown in FIGS. 12 and 13, in the case where the LEDs 164R, 164G, and 164B are provided on the inner peripheral portion of the spacer 16, or the semiconductor lasers 165 are provided on the inner peripheral portion of the spacer 16, a drive circuit for driving the LEDs 164R, 164G, and 164B, or the semiconductor lasers 165 is additionally provided on the sub board 408 shown in FIG. 17.

The arrangement examples of incorporating the liquid crystal display device 10 of the embodiment in an apparatus have been described by a pachinko machine and a slot machine. Alternatively, the liquid crystal display device 10 may be incorporated in other apparatus such as a cash dispenser.

Figure 18:
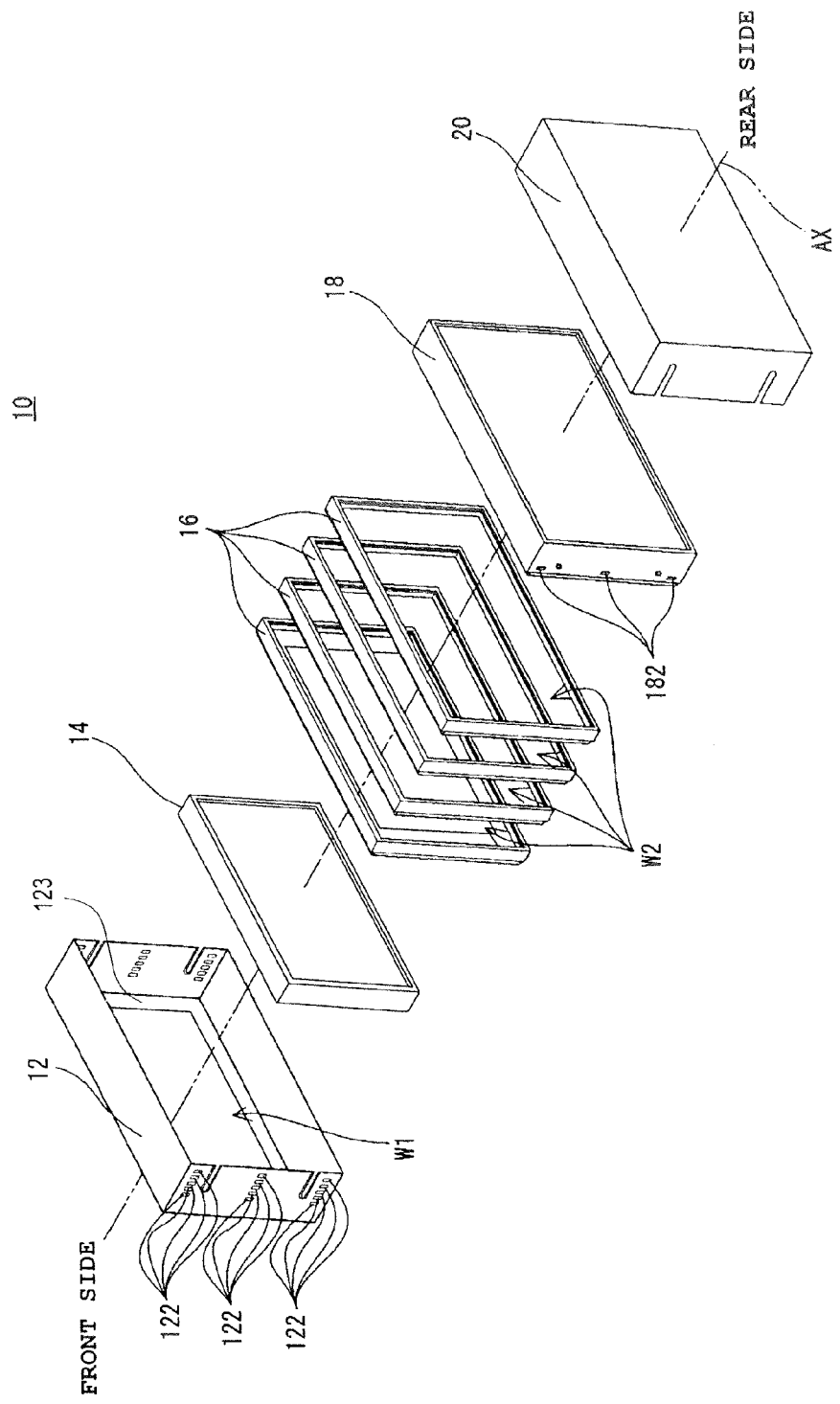
FIG. 18 is a perspective view showing another example of an exploded state of the liquid crystal display device in the invention.
Figure 19:
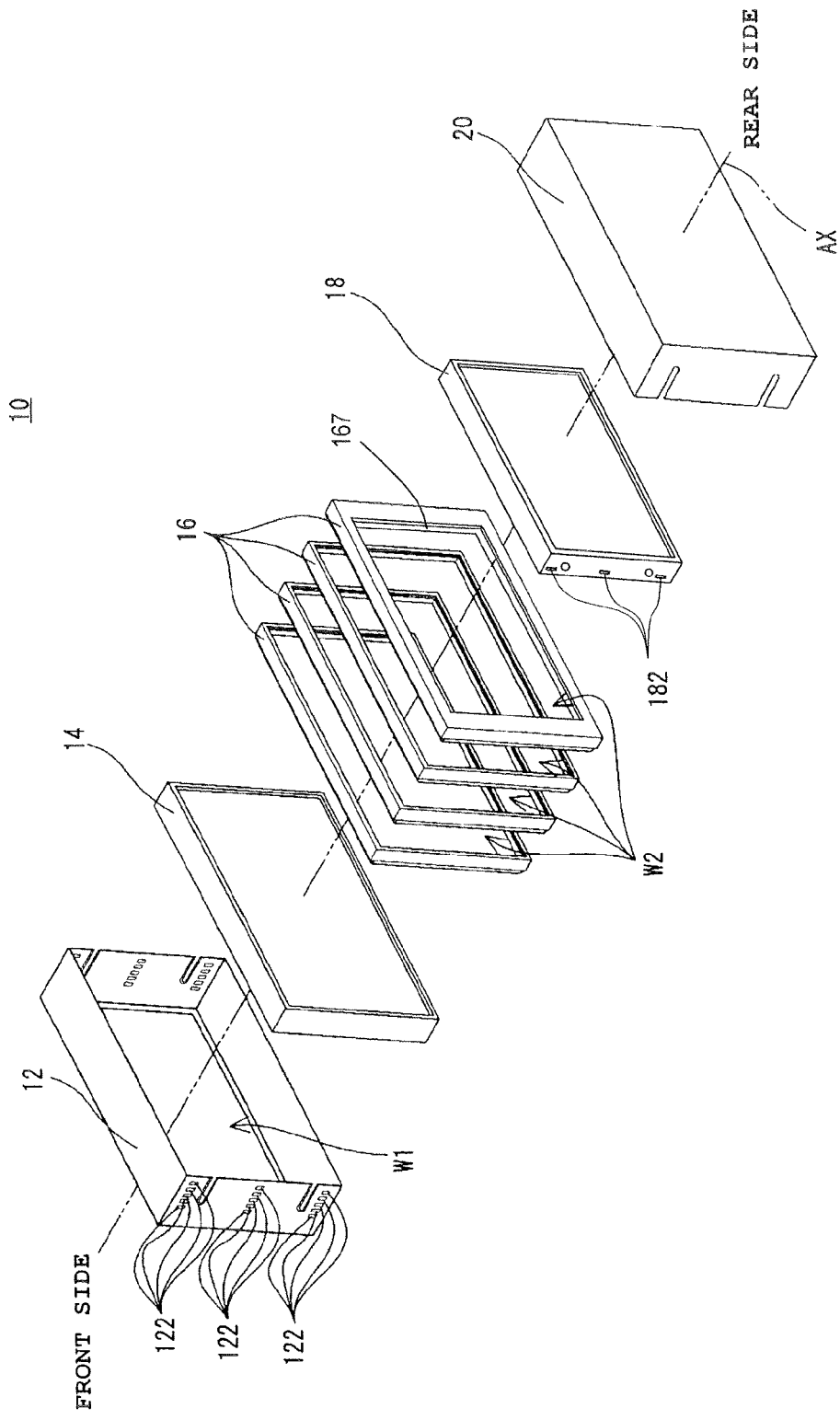
FIG. 19 is a perspective view showing yet another example of an exploded state of the liquid crystal display device in the invention.

In the foregoing description, the sizes of the liquid crystal panels 14 and 18 are identical to each other. Alternatively, the sizes of the liquid crystal panels 14 and 18 may be different from each other. FIG. 18 is a diagram showing an arrangement that the size of the front-side liquid crystal panel 14 is made smaller as compared with the embodiment. FIG. 19 is a diagram showing an arrangement that the size of the rear-side liquid crystal panel 18 is made smaller as compared with the embodiment.

In the arrangement shown in FIG. 18, the size of the window W1 of the front cover 12 is reduced in accordance with the size of the liquid crystal panel 14, and the width of a flange portion 123 is increased so that the front cover 12 can pressingly hold the front wall of the liquid crystal panel 14. Further, the size of the window W2 of the foremost spacer 16 is reduced in accordance with the size of the liquid crystal panel 14, and a frame portion (not shown in FIG. 18) for positioning the liquid crystal panel 14 is formed on a front peripheral portion of the foremost spacer 16.

In the arrangement shown in FIG. 19, the size of the window W2 of the rearmost spacer 16 is reduced in accordance with the size of the liquid crystal panel 18, and a stepped portion 167 for positioning the liquid crystal panel 18 is formed on a rear peripheral portion of the rearmost spacer 16.

Figure 20:
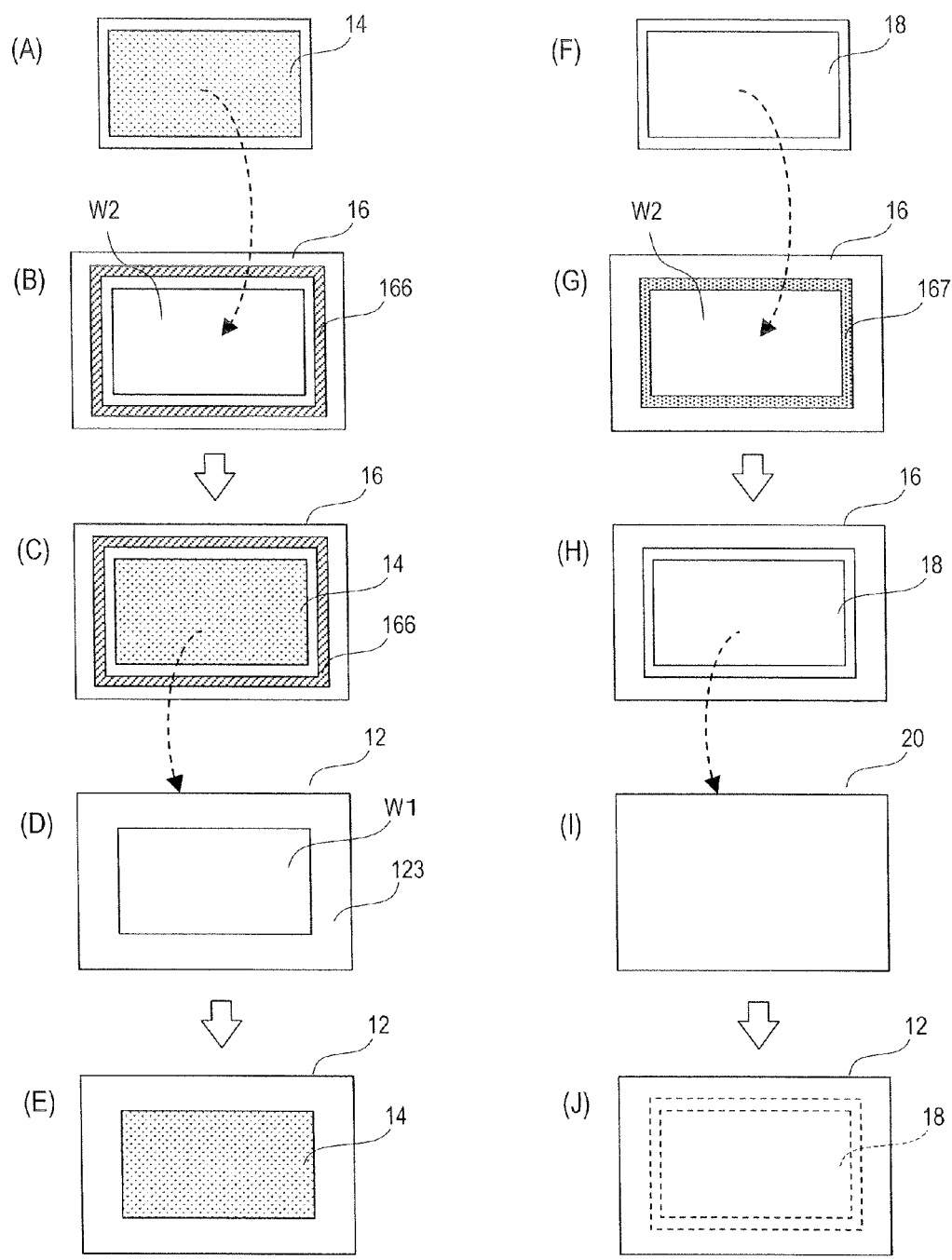
FIG. 20 is a plan view showing a process of assembling the liquid crystal display devices shown in FIGS. 18 and 19.

FIG. 20(B) is a plan view of the foremost spacer 16 shown in FIG. 18, viewed from the front side. As shown in FIG. 20(B), a frame portion 166 having an inner peripheral portion with the contour slightly larger than the contour of an outer peripheral portion of the liquid crystal panel 14 is formed on the front peripheral portion of the foremost spacer 16. The liquid crystal panel 14 shown in FIG. 20(A) is encased in the frame portion 166 from the front side, and is positioned relative to the spacer 16. FIG. 20(C) shows a state that the liquid crystal panel 14 is encased in the frame portion 166. From this state, the spacer 16 is covered by the front cover 12 shown in FIG. 20(D) from the front side. Thereby, the liquid crystal panel 14 is sandwiched between the spacer 16 and the front cover 12, and a displacement thereof in forward and rearward directions is restrained. FIG. 20(E) shows a state that the spacer 16 is covered by the front cover 12 from the front side in a state that the liquid crystal panel 14 is encased in the frame portion 166.

FIG. 20(G) is a plan view of the rearmost spacer 16 shown in FIG. 19, viewed from the rear side. As shown in FIG. 20(G) a stepped portion 167 having an inner peripheral portion with the contour slightly larger than the contour of an outer peripheral portion of the liquid crystal panel 18 is formed on a rear peripheral portion of the rearmost spacer 16. The liquid crystal panel 18 shown in FIG. 20(F) is encased in the stepped portion 167 from the rear side, and positioned relative to the rearmost spacer 16. FIG. 20(H) shows a state that the liquid crystal panel 18 is encased in the stepped portion 167. From this state, the spacer 16 is covered by the rear cover 20 shown in FIG. 20(I) from the rear side. Thereby, the liquid crystal panel 18 is sandwiched between the spacer 16 and the rear cover 20, and a displacement thereof in forward and rearward directions is restrained. FIG. 20(J) shows a state that the spacer 16 is covered by the rear cover 20 from the rear side in a state that the liquid crystal panel 18 is encased in the stepped portion 167.

Thus, three-dimensional appearance or stereoscopic appearance of the display image when viewed from the front side can be changed by making the sizes of the liquid crystal panels 14 and 18 different from each other. In this arrangement, it is required to change the configuration of the spacer 16 and the configuration of the front cover 12 depending on the sizes of the liquid crystal panels 14 and 18, as described above. In the modification, similarly to the embodiment, the spacer(s) 16 other than the spacers 16 for positioning the liquid crystal panels 14 and 18 can be detached according to needs. Thus, the distance between the liquid crystal panels 14 and 18 can be adjusted by the number of the spacers 16 provided between the liquid crystal panels 14 and 18. Thereby, stereoscopic appearance of the display image can be adjusted.

Although the present invention has been fully described by way of the embodiments, it is to be understood that the present invention is not limited to the embodiments. The embodiments of the invention may be changed or modified in various ways, as far as such changes and modifications do not depart from the scope of the present invention hereinafter defined.

What is claimed is:

1. A liquid crystal display device, comprising:
a plurality of liquid crystal panels laid one over the other;
at least one or more spacers detachably provided between the liquid crystal panels;
an engaging portion for determining positions of the liquid crystal panels;
a first cover for covering a part of a first liquid crystal panel disposed at a foremost position of the liquid crystal panels from a front side; and
a second cover for covering a part of a second liquid crystal panel disposed at a rearmost position of the liquid crystal panels from a rear side, wherein
the engaging portion is constituted of a pair of engaging members engageable with each other, the engaging members being provided at the first cover side and the second cover side, respectively,
the engaging member of the first cover side corresponds to a plurality of bored holes formed in a side wall of the first cover in a direction of a thickness of the spacer by an interval corresponding to the thickness of the spacer, and
the engaging member of the second cover side corresponds to a projection formed on a side wall of the second liquid crystal panel.

2. A liquid crystal display device, comprising:
a first liquid crystal panel;
a second liquid crystal panel disposed in a rearward direction relative to the first liquid crystal panel;
a spacer for defining a distance between the first liquid crystal panel and the second liquid crystal panel; and
a fixing mechanism for fixing positions of the first liquid crystal panel and the second liquid crystal panel, wherein
the fixing mechanism fixes the first liquid crystal panel and the second liquid crystal panel at the positions corresponding to the distance defined by the spacer,
the fixing mechanism includes an engaging portion, whose engaging position is variable, for fixing the positions of the first liquid crystal panel and the second liquid crystal panel by engagement,
an interval of the engaging positions is set depending on the distance defined by the spacer,
the engaging portion includes a plurality of bored holes arrayed in one direction, and a projection engageable in one of the bored holes, and
an interval of the bored holes is set depending on the distance defined by the spacer.

* * * * *